(12) United States Patent
Thielen et al.

(10) Patent No.: US 10,950,140 B2
(45) Date of Patent: Mar. 16, 2021

(54) VIDEO PRACTICE SYSTEMS AND METHODS

(71) Applicant: Visyn Inc., Lino Lakes, MN (US)

(72) Inventors: Jeffrey Thielen, Lino Lakes, MN (US); Andrew John Blaylock, Minneapolis, MN (US)

(73) Assignee: Visyn Inc., Lino Lakes, MN (US)

( * ) Notice: Subject to any disclaimer, the term of this patent is extended or adjusted under 35 U.S.C. 154(b) by 293 days.

(21) Appl. No.: 16/016,008

(22) Filed: Jun. 22, 2018

(65) Prior Publication Data

US 2018/0374384 A1  Dec. 27, 2018

Related U.S. Application Data

(60) Provisional application No. 62/523,476, filed on Jun. 22, 2017.

(51) Int. Cl.
| | |
|---|---|
| *G09B 19/00* | (2006.01) |
| *G09B 5/06* | (2006.01) |
| *G06F 3/048* | (2013.01) |
| *G06F 3/16* | (2006.01) |
| *H04N 9/87* | (2006.01) |

(52) U.S. Cl.
CPC ......... *G09B 19/0038* (2013.01); *G06F 3/048* (2013.01); *G06F 3/167* (2013.01); *G09B 5/065* (2013.01); *G06F 3/165* (2013.01); *H04N 9/87* (2013.01)

(58) Field of Classification Search
CPC ........................... G09B 19/0038; G09B 5/065
See application file for complete search history.

(56) References Cited

U.S. PATENT DOCUMENTS

| | | | | | |
|---|---|---|---|---|---|
| 4,107,852 | A | * | 8/1978 | Epstein ................... | G09B 19/00 434/322 |
| 2013/0342470 | A1 | * | 12/2013 | Acar ....................... | G09B 5/062 345/173 |
| 2014/0120510 | A1 | * | 5/2014 | Blanchard ................ | G09B 3/00 434/322 |
| 2015/0294578 | A1 | * | 10/2015 | Gil ......................... | G06F 40/166 434/309 |
| 2016/0005320 | A1 | * | 1/2016 | DeCharms ............ | A61B 8/0808 434/236 |

\* cited by examiner

*Primary Examiner* — Eddy Saint-Vil
(74) *Attorney, Agent, or Firm* — Schwegman Lundberg & Woessner, P.A.

(57) ABSTRACT

A system and method may provide video content for training a user in an athletic motion or action. For example, video content may be provided with diminishing visibility to allow the user to visualize and imagine the action presented in the video content. In another example, a portion of a video content may be faded out, not displayed, or obscured to allow for visualization and imagination of the portion. In another example, video content may be presented in an manner that retains a user's interest despite repeated viewings.

20 Claims, 9 Drawing Sheets

RANDOM NUMBER GENERATOR (RNG) TABLE

| EXERCISE | % LIKELIHOOD OF SELECTION | NUMBER RANGE OUT OF 1000 |
|---|---|---|
| 7 | 4.35 | 1 TO 44 |
| 8 | 10.825 | 45 TO 153 |
| 9 | 21.75 | 154 TO 370 |
| 10 | 26.1 | 371 TO 630 |
| 11 | 21.75 | 641 TO 847 |
| 12 | 10.875 | 848 TO 956 |
| 13 | 4.35 | 957 TO 1000 |

*FIG. 7*

VIDEO PRACTICE SYSTEMS AND METHODS

CLAIM OF PRIORITY

This application claims the benefit of U.S. Provisional Patent Application Ser. No. 62/523,476, filed on Jun. 22, 2017, the benefit of priority of which is claimed hereby, and which is incorporated by reference herein in its entirety.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 illustrates a Random Number Generator (RNG) table in accordance with some examples.

DETAILED DESCRIPTION

Systems and methods described herein are used to provide video content for training a user in an athletic motion or action. For example, video content may be provided with diminishing visibility to allow the user to visualize and imagine the action presented in the video content. In another example, a portion of a video content may be faded out, not displayed, or obscured to allow for visualization and imagination of the portion. In another example, video content may be presented in a manner that retains a user's interest despite repeated viewings.

Research shows that a person's brain may perceive two things from a distant conversation even if they are not paying attention to it. One of these is the gender of the speaker. The other is the sound of the person's own name. In an example, a system includes a set of tools that recaptures user attention. Toward this end, the ability to produce the sound of the user's name is very valuable.

The systems and methods described herein include a platform of streaming video built around the concept of tracking user behavior to infer their mental states. The systems and methods described herein may track an array of data sources related to how the user interacts with the streaming videos (pause rate, frequency of viewing, frequency of stopping view mid sequence, number of views, duration of views, average duration of stopped view, etc.) and combine this data to test for patterns that indicate inattention. In doing so the system may have the ability to stop a viewing mid-stream to switch to another video from the system's video library with the same movement skills content but with a different visual style. Determining that the user has become inattentive may also be performed with biometric analysis.

The systems and methods described herein may add an additional element to the video-switching mechanism by optionally including the sound of the user's name during the process of switching to a different visual style. In general, including the sound of the user's name may be used in conjunction with any attention-retaining mechanism to reinforce the attention-retaining mechanism. In an example, with the user name mechanism, the systems and methods described herein may choose to not change the style and use the sound of the user's name to reacquire attention before returning to the same video content.

Figure 1A:
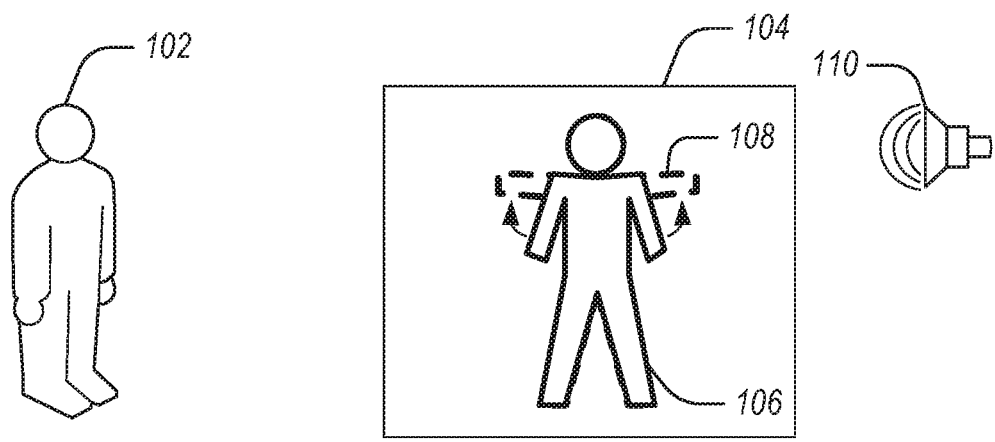
FIGS. 1A-1C illustrate a series of video content displayed with diminishing visibility in accordance with some examples.
Figure 1B:
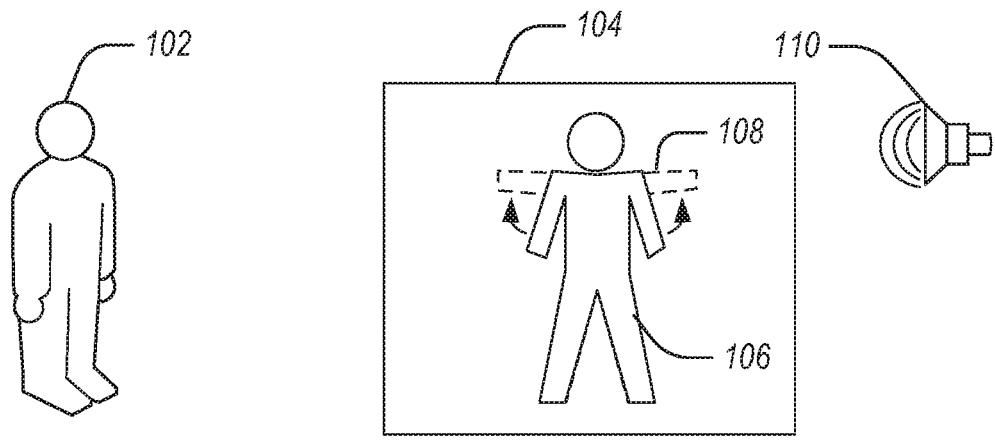
Figure 1C:
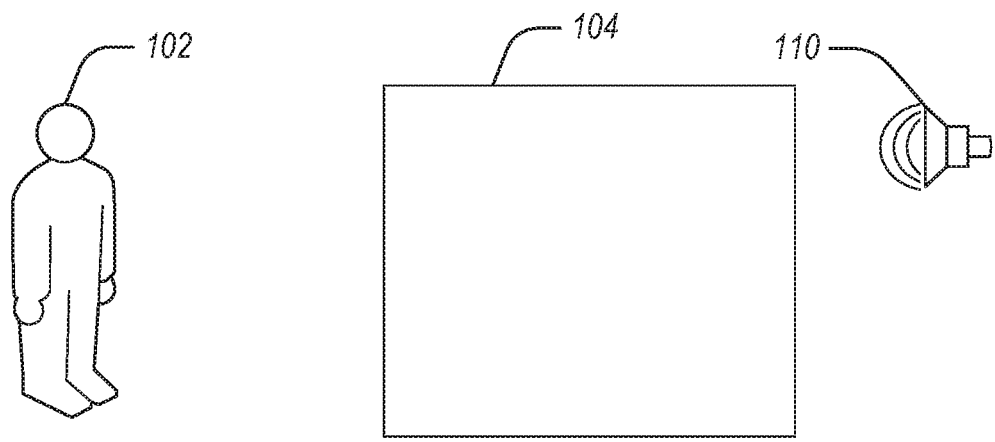

FIGS. 1A-1C illustrate a series of video content 104 displayed with diminishing visibility in accordance with some examples. In FIG. 1A, the video content 104 is displayed fully opaque. The video content 104 may be replayed at this full opacity a number of times before proceeding to a next visibility, or may be displayed just once. FIG. 1B shows the video content 104 at a first transparency level, for example 75% or 50% transparency. The video content 104 may further be displayed at a second transparency level (or third, or fourth, etc.), such as in a progression. The progression from the opaque FIG. 1A presentation to the first transparency level (or from the first to later transparency levels) may occur discretely (e.g., video content 104 presented opaquely in a display and then the video content 104 presented at the first transparency level) or as gradually fading. For example, with the first transparency level at 75% (e.g., where 75% of the image is visible and 25% of the background is shown through), one or more presentations of the video content 104 at 90%, 85%, etc., may be shown before the first transparency level. In another example, the video content 104 may fade during a single presentation (e.g., starting opaque and transitioning to the first transparency level during a showing). FIG. 1C shows the video content 104 with a portion completely faded out (e.g., a model 106). Background content (e.g., visual or audio) may still be presented in the completely faded out scenario of FIG. 1C, but is shown blank in the figure for simplicity.

The video content 104 may be presented to a user 102. The video content 104 may feature a model 106, with a focal portion 108. In an example, the focal portion 108 may fade (e.g., gradual transition or jump to a particular transparency or completely fade out) while the remainder of the video content 104 does not fade. For example, the focal portion 108 may be in a first transparency level in FIG. 1B, while the remainder of the model 106 is still displayed in full opacity. The focal portion 108 may be an arm, a leg, or another body part, or a portion of a body, an instrument (e.g., a golf club or bat), or the like. Similarly, the focal portion 108 may be faded out entirely while the remainder of the model 106 is still shown in full opacity, or at a level of transparency that is less than 100%. By using a graduated transparency of the focal portion 108, the user 102 is provided "training wheels" for the visualization of the imagery (e.g., model 106 and focal portion 108). The gradual reduction of opacity forces the user 102 to generate more the imagery in their mind, as opposed to perceiving it directly, which helps train the user 102 to visualize more accurately.

In addition to video content 104, a speaker 110 (or other audio generation device) is used to provide audio cues to the user 102. The audio cues may be a tone to alert the user 102 of transitions in the video content 104.

Figure 2:
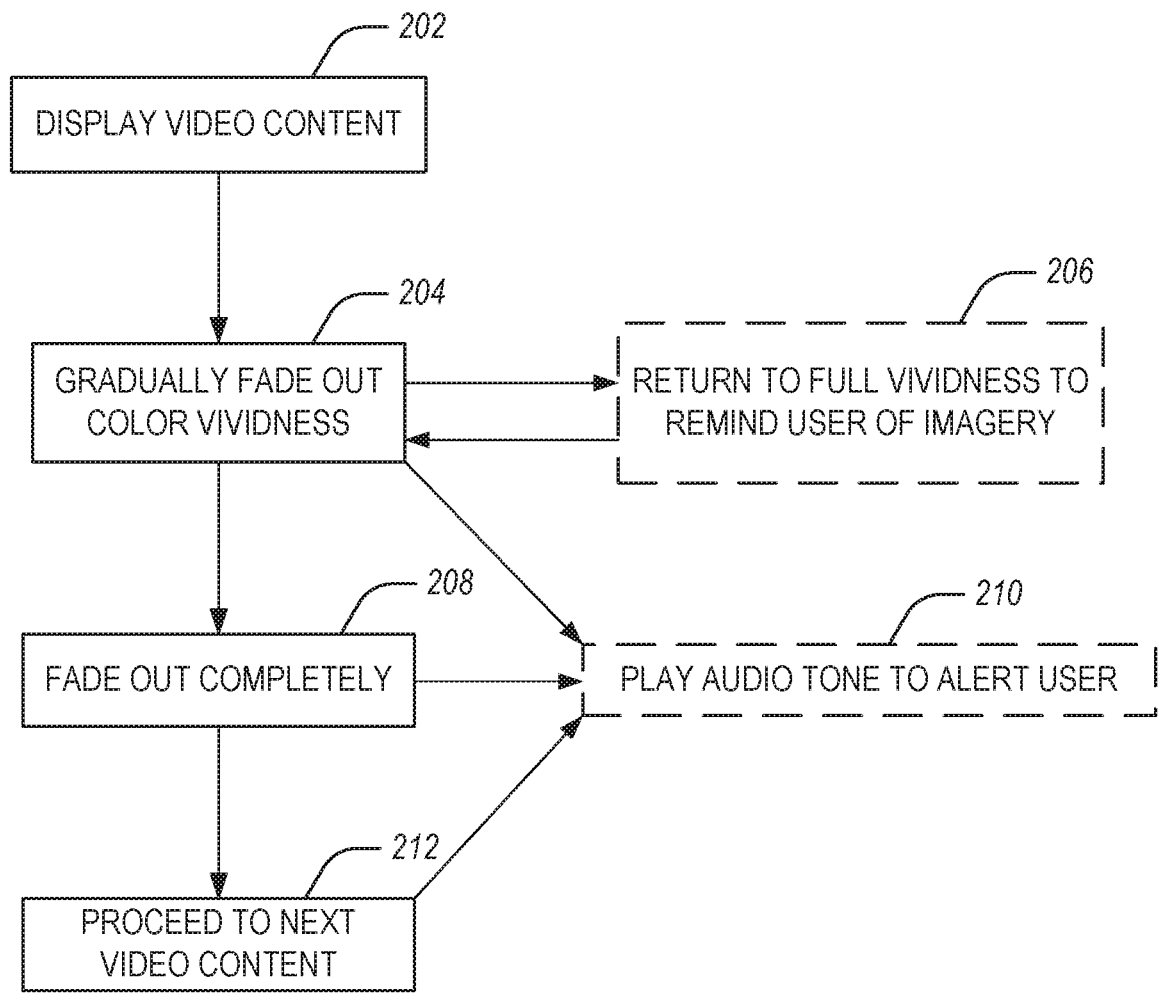
FIG. 2 illustrates a flowchart showing a technique for virtual transposition control in accordance with some examples.

FIG. 2 illustrates a flowchart showing a technique 200 for virtual transposition control in accordance with some examples.

The technique 200 includes an operation 202 to display video content.

The technique 200 includes an operation 204 to gradually fade out color vividness (e.g., display a portion of the video content at a first transparency level).

The technique 200 includes an operation 206 to optionally, while fading (or in between transparency levels), return to full vividness (e.g., of a portion of the video content) to remind a user of the imagery intended to be imagined.

The technique 200 includes an operation 208 to fade out a portion of the video content completely.

The technique 200 includes an operation 210 to optionally play an audio tone to alert the user. The audio tone may be used to alert the user that video content is starting, is starting to fade, is done fading, is completely faded, that the user should close their eyes or open their eyes (e.g., at the beginning or end of an imagination period), that the fade out time is completed, or the like. Visual cues may be used to indicate any of these situations as well, except in conditions where the user's eyes are closed. However, even in those conditions, a very bright visual cue may still be effectively used.

The technique 200 includes an operation 212 to proceed to next video content. Operation 212 may include repeating the previously displayed video content (e.g., with different fade out timing or duration), or moving onto a new video content (e.g., a second subskill related to a first subskill displayed in the video content).

Figure 3:
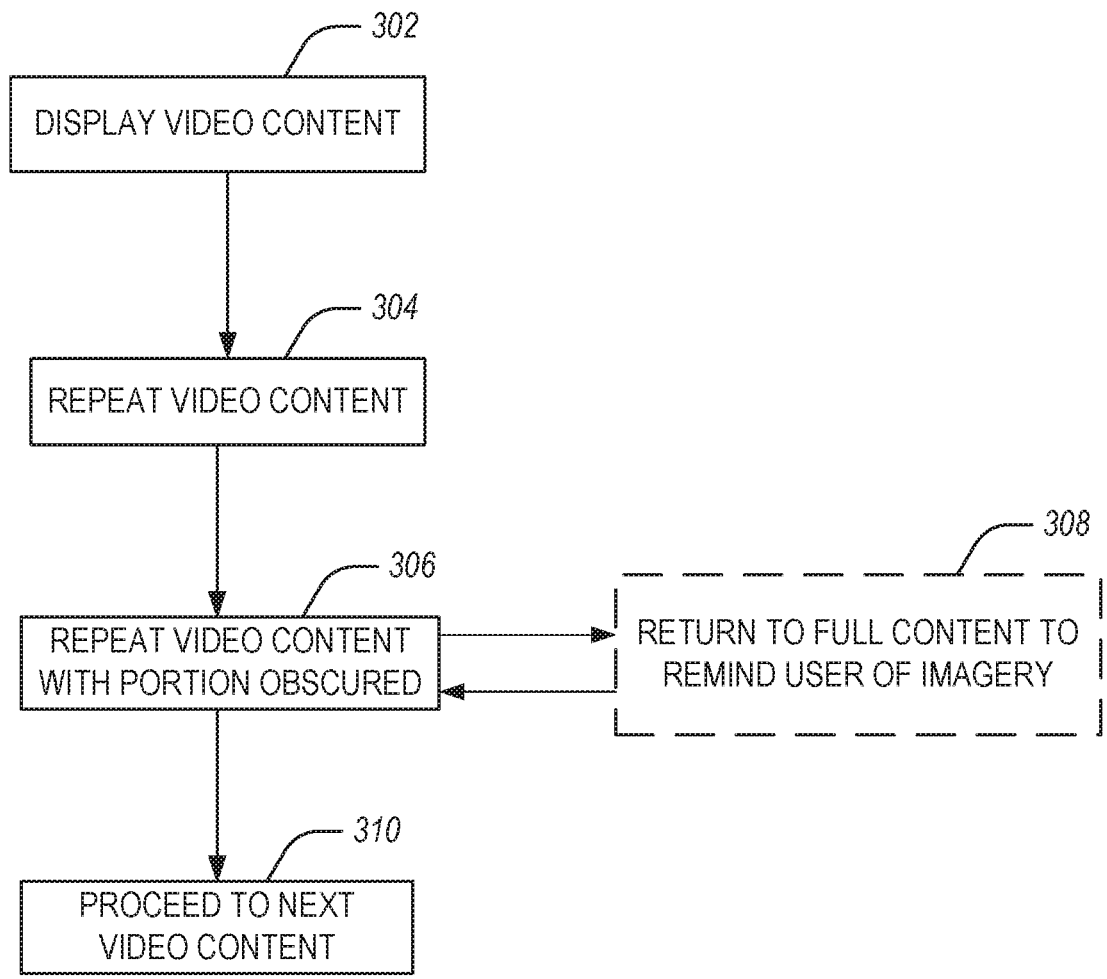
FIG. 3 illustrates a flowchart showing a technique for virtual transposition using partial obscuring in accordance with some examples.

FIG. 3 illustrates a flowchart showing a technique 300 for virtual transposition using partial obscuring in accordance with some examples.

The technique 300 includes an operation 302 to display video content.

The technique 300 includes an operation 304 to repeat the video content (e.g., with all or a portion of the video content at an increased transparency or remaining opaque).

The technique 300 includes an operation 306 to repeat the video content with a portion of the video content obscured (e.g., a body part or focal portion of the video content).

The technique 300 includes an operation 308 to optionally return to full content (e.g., full opacity of any portions transparent or obscured) to remind a user of the imagery.

The technique 300 includes an operation 310 to proceed to a next video content. Operation 310 may include repeating the previously displayed video content (e.g., with different fade out timing or duration), or moving onto a new video content (e.g., a second subskill related to a first subskill displayed in the video content).

In an example, an Observational Learning (OL) based system may be used to train a user. OL includes providing a user with an opportunity to passively take in imagery and learn as a result of the neural processing that occurs to make sense of it. Mental Imagery Training ("MIT") uses the active building of imagery with a user's own imagination providing a user with an opportunity to see concepts in the mind's eye to stimulate learning. Virtual Transposition ("VT") is where these two concepts meet, providing the value of the control and detail level that OL may provide with the active nature of MIT which may itself create stronger encoding than OL. In an example, it may be the case that the active nature of MIT does not create stronger encoding, but the VT method benefits from a synergistic interplay between OL and MIT which creates the stronger encoding. The idea here is then the use of VT to create faster learning in a user. In an example, VT sequences may be built into a streaming video based training product.

Virtual Transposition includes showing imagery to a user and then asking the user to replay that imagery in their own imagination. In an example, executing video demonstrations may be used with several repetitions of content learned (e.g., a model, whether it be a human movement or animation, etc.) and then providing an opportunity for the user to imagine the content, such as using a blank screen or instructions for the viewer to close their eyes (or keep their eyes open but focus on internal mental imagery). In an example, repetitions may be imagined of the exact imagery just observed. In an example, additional guidance may be added to the process to ensure the active (imagined) part is as rich and detailed as possible. Additional guidance may include visual, audible, or haptic feedback.

Instructions may be presented to a user on what is to happen and what their active part in it is. Several repetitions of a human movement skill may then be shown to the user. While showing those repetitions, the human movement skill imagery in the frame may gradually fade out (optionally the background may fade out or may remain vivid). The fade out may include a portion of the human movement skill imagery, the entire imagery, or the entire video presented. While the imagery is gradually fading out, the user's task is to use their imagination to attempt to perceive it in their mind's eye in full vivid intensity and color. Eventually it may disappear completely, at which point the user is instructed to continue to imagine the previously demonstrated imagery. As discussed above, this process assists the user to create a more accurate visualization and as a result, obtain skills faster through visualization.

This stage where the imagery has faded out entirely may be done with the eyes open the whole time which has the advantage of allowing the user to know when to view new imagery since it may be displayed on screen. In an example, the imagining may be done with the user's eyes closed toward the end of the process. In this example, signal tones may be used to instruct the user when the user's eyes are closed or when the user's eyes are open. For example, three signal tones may be used. The first tone may chime just after the process of the image fading out begins. This is to tell the user that they may begin imagining the imagery in full vivid color as the screen fades. The second one may chime just before the imagery completely fades away and this may be to let the user know to continue imagining the imagery (and optionally close their eyes). The second tone may instruct the user to continue imagining with the eyes closed or open. The third tone may chime to let the user know to proceed to a next video or process, or to open their eyes for the next guided VT or to change to different VT or OL content.

In an example method extra vividness may be added to moments during the fading out process. The user may benefit from a brief reminder of the full color vividness of the movement that the user is trying to remember with their imagination. For example, during the fade out process, a slow strobe light effect may be introduced. The imagery may fade away, and be periodically restored to full color and brightness for a brief time before returning to the fading process. An example set up may include the strobe effect once every two seconds lasting for 0.1 seconds. The movements shown may be done in slow motion. The strobe effect version may work better in slow motion than full speed, as slow motion allows for time to space out the bright and vivid instants of the strobe effect.

In an example method, a full body (e.g., model) may be shown for several repetitions and then for a series of repetitions a display may show the same imagery with a portion of the body obscured and ask the user to fill in the blank by imaging the imagery associated with the motion of the obscured part. During the portion where the user is using their imagination to fill in the missing part, the user may be doing the imagining with their eyes open. In an example, images may be displayed as 3rd person or 1st person images. In an example, a duration of an operation may be adjusted.

While performing any of these methods, executing an example version of virtual transposition, doing mental imagery training, or just doing observational learning, the imagery may be either from a 3rd person perspective or a 1st person perspective. When imagining technique, a 3rd person perspective may be used. In addition to imagining the details of a technique a user may also imagine the outcome or results of a technique. The imagining may be effective from a 1st person perspective when internalizing the positive emotions of a good outcome or good results. In another example, from a 3rd person perspective the user may see both technique and outcome or results and create an association between the two. In an example, when the user is imagining the internal feeling of executing a technique, it may be done from a 1st person perspective.

When executing VT, metrics may affect the learning value. These may include duration of imagery displayed, duration of imagining the imagery, or ratio between the two. In an example, finding the right duration leads to better retained attention and better vividness of imagined imagery. More time viewing the displayed imagery may lead to better vividness during imagination, but may lead to inattention. More time imagining may lead to a greater learning result due to the active nature of mental imagery training, but the detail and vividness may diminish over time. The best combination of the two may lead to the right ratio with the correct overall duration of a full cycle of VT. In an example, a duration of displayed imagery may correspond to a duration of imagining the imagery e.g., imagining the imagery having a duration equal to the duration of displayed imagery, such as one presentation of a movement).

Figure 4:
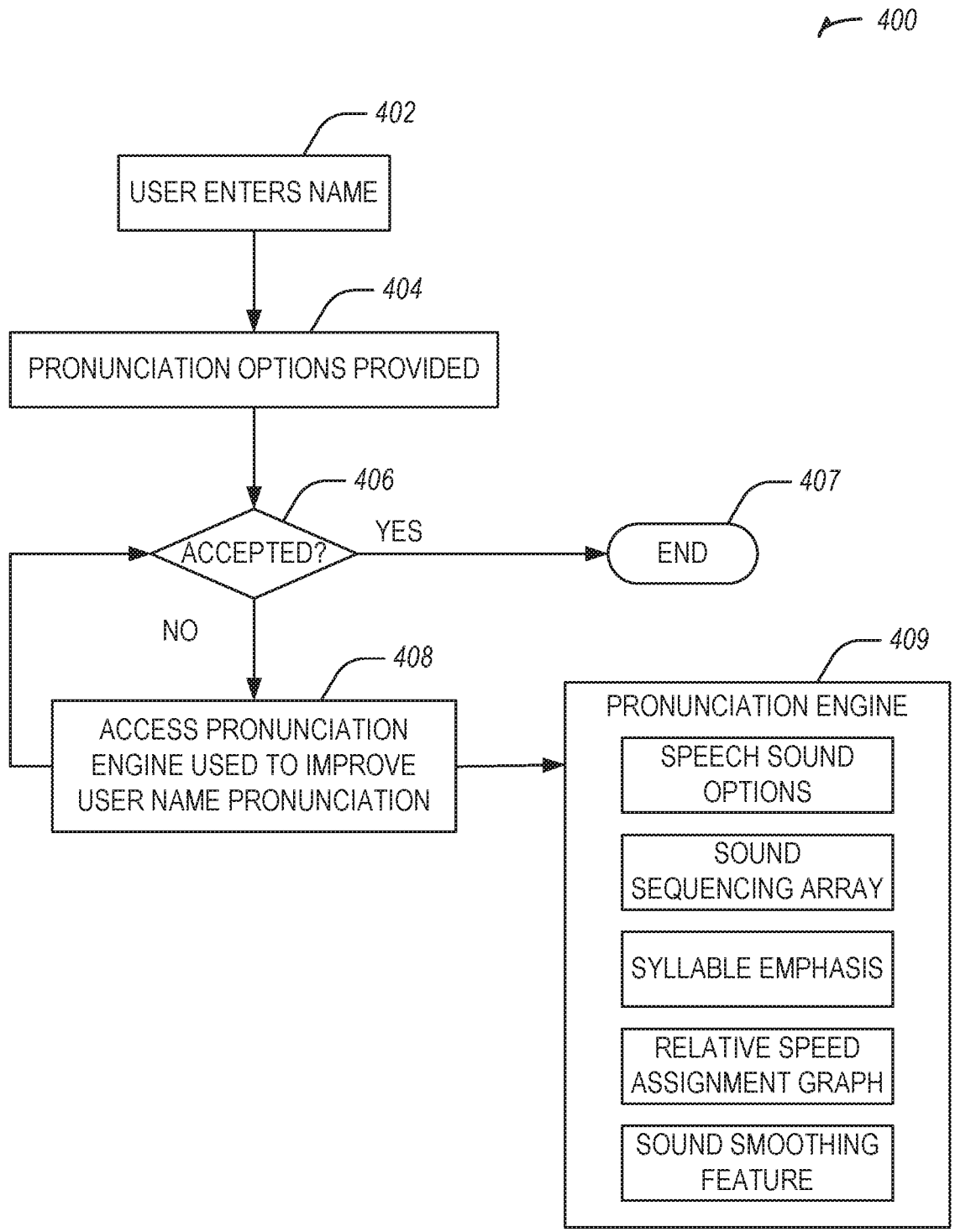
FIG. 4 illustrates a flowchart showing a technique for user name pronunciation customization in accordance with some examples.

FIG. 4 illustrates a flowchart showing a technique 400 for user name pronunciation customization in accordance with some examples.

The technique 400 includes an operation 402 to receive entry of a user's name.

The technique 400 includes an operation 404 to present pronunciation options for the user's name.

The technique 400 includes an operation 406 to determine whether a pronunciation presented has been selected by the user. If accepted, the technique 400 may end at operation 407.

If not accepted, the technique 400 includes an operation 408 to access a pronunciation engine 409 used to improve user name pronunciation.

The pronunciation engine 409 is used to improve a pronunciation. The improvement may occur using speech sound options, a sound sequencing array, syllable emphasis, a relative speed assignment graph, or a sound smoothing feature. The technique 400 may apply one or more of these functions to improve the user name pronunciation. After the application of the functions of the pronunciation engine 409, the technique returns to operation 406 to determine if the user has accepted the pronunciation. If so, then the technique 400 ends at 407; if not, then the technique continues to operation 408 again. The technique 400 may abort after a number of failed attempts to improve the pronunciation or in response to a user input.

Figure 5:
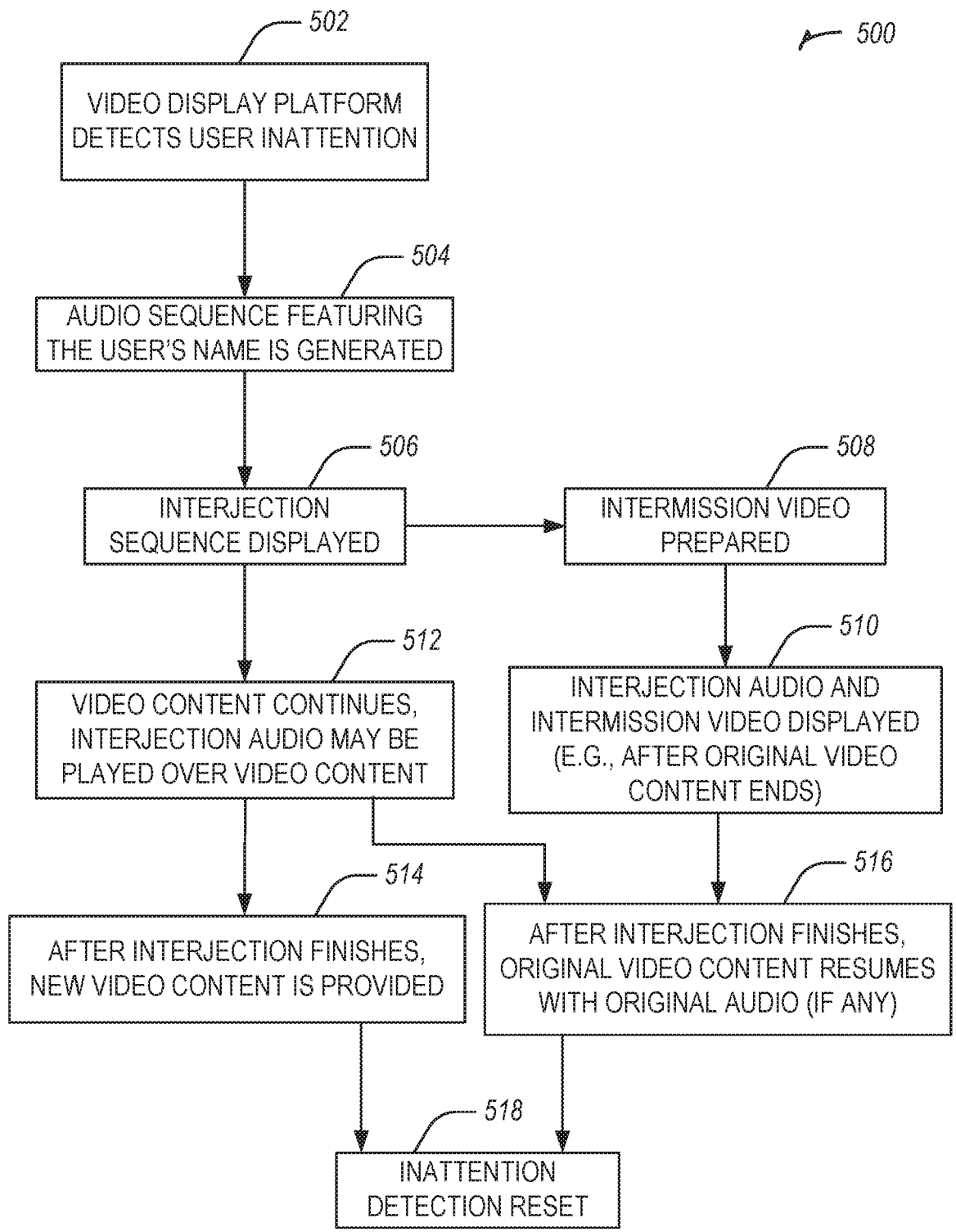
FIG. 5 illustrates a flowchart showing a technique for user name interjection in a video in accordance with some examples.

FIG. 5 illustrates a flowchart showing a technique 500 for user name interjection in a video in accordance with some examples.

The technique 500 includes an operation 502 to detect user inattention (e.g., at a video display platform).

The technique 500 includes an operation 504 to generate an audio sequence featuring the user's name.

The technique 500 includes an operation 506 to interject the sequence (e.g., within the video content) including the user's name. In an example, the technique 500 includes an operation 508 to prepare an intermission video including the user's name.

The technique 500 includes an operation 510 to, after the intermission video is prepared, interject audio and the intermission video displayed (e.g., after original video content ends, or within a sequence of video content).

The technique 500 includes an operation 512 to play video content (e.g., continue playing or play new video content), with the interjection audio played over the video content.

After the interjection finishes, new video content may be provided at operation 514. In another example, after the interjection finishes, the original video content may resume, such as with original audio, if any, at operation 516.

The technique 500 includes an operation 518 to reset inattention detection for the user (e.g., go back to the start of the technique 500 and wait for another detection of user inattention).

In an example, it is possible to track biometric values (pupil dilation, heart rate, body temperature, etc.) measured from sensors monitoring the user directly to detect user inattention. The purpose of tracking is to determine a point where they exceed a threshold. Exceeding a threshold then triggers a content change in the video stream. Those operations are covered elsewhere. This document is intended to discuss an optional additional technique that may be implemented when it is time to execute a content change or to regain user attention without a content change.

The user may have their name attached to their user account. When setting up their profile they may be able to choose from several pronunciations for their name so that the correct sound of their name may be saved. If they may not find a satisfactory pronunciation, a sound profile for a given name spelling via a customer service interaction may be added.

Then, when a pattern of inattention is detected, an intervention may be triggered. In the case where User Name Interjection is used, this intervention may use the following operations.

Stop the current video, which may include moving to other video imagery which is a black screen, white screen, color patterns, or other imagery that is not relevant to movement skills training and add audio overlay on the fly.

An example of the audio overlay to add is the following, "[sound of user name], we have detected that you are beginning to become less responsive to the video content. We are going to change up the visual style for you to make things more interesting."

Return to original video content or begin playing alternate video content.

Based on the way user data is tracked and analyzed, this trigger may be detected in between viewings. In this case a delay may be built into the process. The delay may allow the user to watch the first five or so minutes of the next video and then implement the content switch sequence. In an example, the intervention may be executed at the beginning of a video, but it is expected that it may have more impact if it is implemented a few minutes into the video.

The time series choices related to movement skills information, salient cues, camera angles, and other video production choices may be optimized in video production to produce the highest rates of improvement. That being the case, the system may use multiple versions of videos that have the same time series sequencing as described in the previous sentence, but such that the different versions have different visual styles. Then switching between these videos which feature the same time series sequencing of movement skills content involves stopping one at a specific point in the time series from one video and then starting the next video at that same time series position. The present discussion is about interjecting the user's name in the way described above in between the two videos during that switch. In an example, incorporating the user's name into the audio overlay may be boldly done or in background like an Audio Jungle (a provider of background music for commercial video production) "audio watermark". In an example, audio or visual interjection of a name may be used where "visual interjection" means adding a layer that displays the user's name in front of the normal video content to the video stream on the fly.

It may be the case that optimizing the exact time series in the video production produces a limited effect. In that case, the exact sequence of video production choices which may be strung together may be added to a list of things that may be varied to recapture user attention. Even in that case, the user may be learning the same subject movement skill content, so that aspect may not change. However, in a more general case, even the specific subject matter may be changed to teach a user a different topic so long as the system may eventually return to complete the topic content that was switched away from when user inattention was detected.

Another possible use of the user name interjection is to add an audio segment that lays over the top of the stream to get the user's attention. This may be a loud or subtle addition of audio. Also, it may replace the audio of the video, making the standard audio go silent for a period and during that time the system may add in the audio of the user's name.

In another embodiment the user name interjection may be multimodal meaning that it would be displayed both with visuals and audio at the same time.

Figure 6:
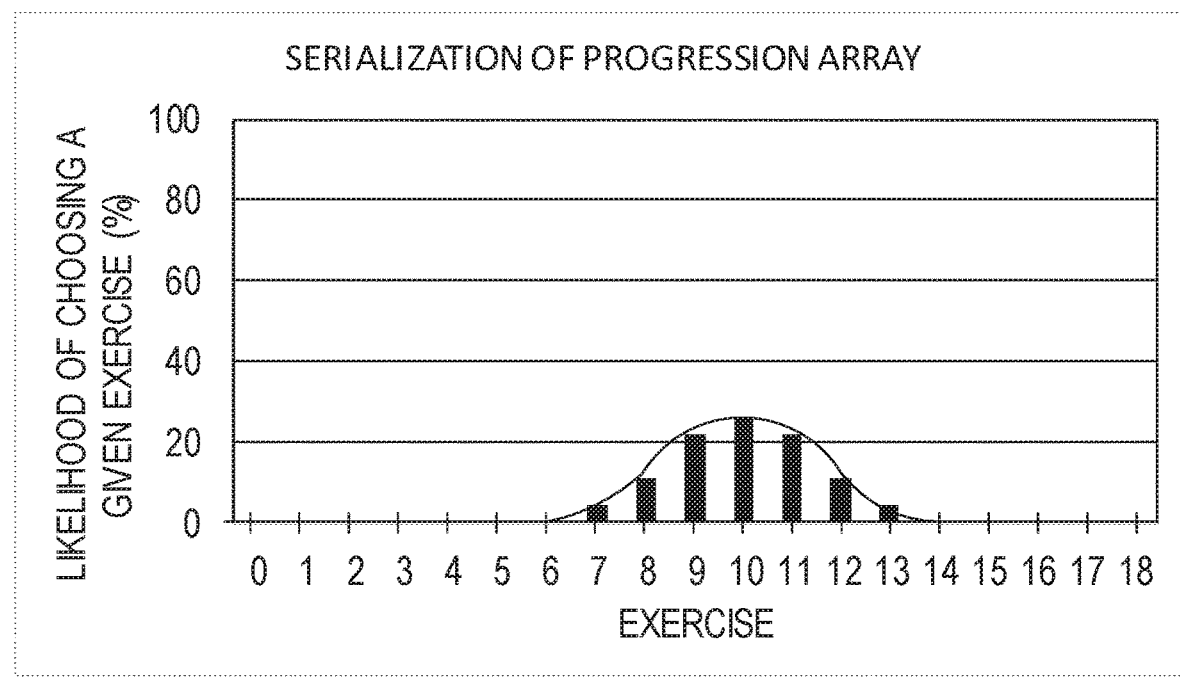
FIG. 6 illustrates a serialization graph for a Gaussian progression control system in accordance with some examples.

FIG. 6 illustrates a serialization graph for a Gaussian progression control system in accordance with some examples.

A Gaussian varied practice assurance system may be used to generate progressive video. In an example, the varied practice concept may be applied to an automated coaching system.

The system quantifies user body position a user attempts to match a movement pattern that the system has demonstrated to them. In an example system, the user may be guided toward a movement pattern that largely matches the one that the system demonstrates. In an example, the system may progress to follow a refinement process while working on subsequent techniques.

Varied practice has many benefits which may support both real and perceived value of utilizing the system. In an example, there is another concept, the complex progression design and the serialization of said progression, uses an organized approach to sequencing training. In an example skill acquisition scheme, progressions may exist at different scales. In an example, there may be progressions within progressions. In an example, any multidimensional array of discrete elements may be encoded into an ordered string. This is true for the full skill acquisition progression for a given discipline. In each case, the complex structure of a skill progression may be distilled into an ordered string of exercises that the system may follow.

In an example, a rate of learning may increase by as much as double by implementing varied practice. Also, a mechanism that drives these gains is memory consolidation or encoding stimulation. When a stimulus is new, the rate of memory encoding that follows is far higher than when one has previously worked through a series of encounters with that stimulus.

In an example, a system may preserve a high rate of encoding. The stimulus may be varied to ensure that the stimulus is changing. In an example, the stimulus may be varied from say throwing a baseball pitch (the very thing to be improved) to kicking a soccer ball, the user may be off track and no longer be encoding for the same task which may not be desirable. In an example, when a new exercise is chosen, it may be closely related to the task movement patterns to be encoded.

In short, a scheme that has a bunch of similar, but not too similar, exercises to work through where they are related to one "focus" technique may lead to the fastest learning. Further, this learning may be more adaptable to dynamic situations as compared to learning resultant from a focus on one variation on a technique. This is more valuable in a discipline like soccer where opponents may affect a user's technique greatly by forcing you to deal with their body mass and momentum during play as opposed to say baseball pitching where they may not influence you in that way.

Another large value-add related to varied practice is related to user experience and the perception of enjoyment while using the system. The concept of boredom may be termed as a sensation of displeasure related to a lack of stimulus or a lack of novel stimulus.

Let's now address the serialization of the complex progression. Within the movement skill development world, the term "progression" is used to describe the full scope of skill acquisition from basics to refinement at the highest levels of the activity. It also may refer to a series of exercises to work on a single aspect of a technique. It is also applied to slices of progression at scales in between those two. In an example, human coaches know the general progressions including the following three examples: the set of techniques that are to be acquired, drills to help with a technique, and details to address within a drill or technique which have some structure of "prerequisite" ordering.

In an example, the progression in a movement skill discipline is not serialized as a string of the smallest components, but is hierarchically organized with sub progressions of drills under a technique, and sub progressions of details to get correct within a drill. Coaches then improvise to generally, but not precisely, follow a serialized progression through the hierarchy.

In an example, a serialized progression through the hierarchy for a discipline may be performed. That way it is clear for the system that one exercise follows after another. An example system may include predetermined standards of mastery for a skill. In an example, the system may be set up so that a user is to achieve a level of performance before advancing.

A serialized progression where you may not move from an exercise until you have reached a mastery or proficiency standard may eventually become a "grind". If, in an automated system, the user may get stuck on the same exercise for an extended period of time as the user struggles to achieve mastery or proficiency, it may eventually result in elimination of variety in the practice stimulus, boredom, and reduced encoding.

In an example, a system may allow manual intervention, allowing a user (possibly with the approval of an expert) to force the system to allow them to work on a different task if they "get stuck". That is generally unsatisfactory because it implies that the user may get to a point of frustration with "getting stuck" (which would constitute an unpleasant user experience) before they then choose to act. This Gaussian Overlay system is designed to preempt this possibility.

When an athlete is at a certain point in a progression, there may not be an actual tangible ability to determine where they are. Human coaches use their expertise to guess where the athlete is in the progression, or to be more accurate, what the athlete is working on. Further, to keep the athlete engaged, human coaches have players work on many exercises "around" their present threshold of "mastery" or "proficiency". Finally, human coaches may also find supporting exercises that are similar to the current area of focus that help to develop habits that bring about high quality movements when executing the primary exercises. These "support exercises" may be considered to be part of the main progression even though they are not techniques that are intended to be used in performance scenarios.

In order to replicate these factors in an automated system, a serialized progression may be established for the system may work through. This allows us to organize which exercises may come generally prior to others. Then, exercises may be selected to work on by assigning probabilities to exercises in the area around the exercise at the current threshold of proficiency and using a Random Number Generator (RNG) to choose a number which corresponds to the field which has been assigned to an exercise. Then, the exercise that has been assigned the chosen number in their field may be the one that gets worked on.

"Work" on an exercise constitutes spending some amount of time learning how to do it properly and executing repetitions. For example, five to ten minutes. After this time, the progression may move forward if the conditions for doing so have been met. In another example, the process of assigning number fields to the exercises in consideration and using an RNG to select a number may be repeated to select a new exercise. It is possible that the most recent exercise (or most recent few) may be removed from consideration for selection to ensure the randomized selection process doesn't choose a long string of the same exercise, which may be a possibility however low the probability of occurring may be.

Let us now consider some details of how this may be achieved. In an example the RNG may be tasked with choosing a number between 1 and a chosen number, "n". For example, let us use a range between 1 and 1000. Probabilities may be assigned based on a distribution of probabilities such that the full range between 1 and 1000 get used up. In an embodiment, the distribution may be modeled after a Gaussian distribution.

Using a Gaussian distribution, allowing plus or minus four exercises from the current threshold of proficiency, the system may center the distribution on the exercise that is the threshold of proficiency and may include values in the fields for exercises four posterior to the threshold of proficiency and four anterior to the threshold of proficiency. Then the classic bell curve of a Gaussian distribution may be broken into nine parts with each containing an equal distance on the x-axis (not counting the 0.01% of the distribution that lies on the infinite tails on either end of the Gaussian Distribution). Breaking it into nine parts leaves a certain percentage of the total area under the Gaussian distribution curve for the nine segments with the three segments closest to the center containing the most.

To assign the field for an exercise, the percentage contained in the left most segment of the distribution may be multiplied by 1000, rounded to the nearest whole number, and then assigned the numbers 1 to the resulting value to the most posterior exercise in the progression. The percentage of the segment to the right of this first one may be similarly modified. After multiplying that percentage by 1000 and rounding to the nearest whole number, that number of numbers to the field for the corresponding exercise may be assigned such that the lowest numbers are chosen among those that are available after assigning the first set of numbers to the first segment. This process may be repeated for all nine segments and the full field of numbers 1 to 1000 may be assigned.

Once numbers are assigned, a RNG may be applied to select a number from 1 to 1000 to choose which exercise to work on. FIG. 7 illustrates a Random Number Generator (RNG) table in accordance with some examples. The RNG table of FIG. 7 may be used with some examples as described herein.

In an example, this process may not need to be executed based on a Gaussian Distribution. It may instead be executed on a triangular distribution, a flat distribution, or even a customized distribution for a proficiency threshold exercise that correlates the exercise to its most closely related support exercises to make sure selection focuses on those as opposed to merely somewhat related exercises.

However, the Gaussian distribution is built on a foundation that factors in both a natural property of randomness and a tendency to cluster around a central position. In an example, the distribution may be centered around a central point that is at least near to the current threshold of proficiency. True randomness around that point may be the best distribution to foster the human perception of randomness and thus changes throughout the progression and the Gaussian Distribution achieves those.

With the concept of selecting from a set of exercises that surrounds a central exercise which is the user's current threshold of proficiency in place, the system may deal with both progression and variety. Progression, in a basic sense, may operate the same way that it does in a strictly linear sequential progression system. Once a skill has been practiced to the point where a user may perform up to a certain standard, that user may move on. In this case, moving on means the progression moves forward down the line so the selection system has a different set of exercises to select from (if it moves forward one exercise, then the set may be largely the same, but with different probabilities for the exercises and one new exercise replacing one old exercise based on how the Gaussian Distribution overlays the exercise sequence).

Note that there is an interesting dynamic at play, however, in that the system may often be able to move forward multiple exercises. This is because there may be a large selection of exercises that lie ahead of the current threshold of proficiency where the user may become proficient in before they pass the standard of proficiency on the exercise where the threshold is. Then when they do achieve that standard they may already have proficiency in one or more exercises ahead of that one, meaning they may progress ahead multiple operations at that point.

Note also that there may be a trailing (or leading) threshold of proficiency. This is a threshold that is centered a certain number of exercises behind (or ahead) of the center of the distribution. The threshold being behind the center of the distribution may lead to substantial practice on an exercise before it becomes the threshold of proficiency and minimal practice after the threshold is passed. This may be executed by centering the distribution a few exercises ahead of the threshold of proficiency and then doing the rest of the selection process in the normal way. In an example, a tougher standard of proficiency for a trailing threshold may be used.

Further, there may be multiple thresholds of proficiency in play. A good example may be to have a leading threshold which has a weaker standard of proficiency and a trailing threshold that has a tougher standard. The distribution may be positioned as determined by either standard such that if they do not agree it is positioned to the rearmost (relative to the direction of the progression) location chosen between the two thresholds. Then, as the progression moves, the user may encounter a point where an exercise becomes the leading threshold of proficiency and in order to progress they may have to achieve a low level of proficiency. Then later as they progress that same exercise may become the trailing threshold of proficiency and they may achieve a high level of proficiency on that same exercise in order to progress.

To further illustrate the idea of the rearmost position for the distribution based on the two threshold tests, the user may pass the leading threshold test, but not the trailing. Then the leading threshold may move forward, but the distribution may not move forward until the trailing threshold test was passed. Likewise, if they were able to pass the trailing threshold test, but not the leading one, the trailing threshold may move forward, but the progression may not. Note that in an example, the user may be made aware of the fact that they are facing a progression test, or they may be tested during the normal course of progression (by keeping track of performance data). Also note that there may be more than two threshold tests applied with effectively the same dynamic described above.

If the RNG takes an arbitrarily long time before selecting an exercise which is the current threshold exercise, then the user may not progress until it is selected and may not pass at that time either, forcing them to wait even longer. So, the system may apply a superseding rule that says, if the system hasn't selected the exercise that is the threshold of proficiency for "n" iterations, then the next time it may automatically be chosen. This ensures that there may be regular and consistent work on the exercise that the user may "test out on" in order to progress. In the case where multiple thresholds are in play that are holding up progression, the system may choose a specific one by default. In an embodiment, the rearmost one ("trailing") relative to the direction of the progression may be chosen. In fact, it may be the case that it is specifically not choosing this rearmost threshold whose standard may be passed to progress which triggers this forced choice as opposed to considering between thresholds whose standard may be passed.

One may also consider how it may make sense to vary the nature of the distribution as the user progresses. In the beginning fundamentals are foundational. A less broad Gaussian distribution (one that considers fewer exercises in its selection range) is appropriate in this phase. Also, the system may likely allow fewer iterations that do not choose the exercise that is the current threshold of proficiency before forcing that choice. With progression, fundamentals are in place and more variety in practice is likely of greater benefit, allowing for a broader distribution to be used.

In an example, changes may be made at the beginning or the end of the progression. Progressions may be set up to include a finite number of exercises. It is natural to label them as one may count them, starting at one and counting by one until the end of the progression. Then, a distribution centered on the first or the last exercise in the progression sequence may wind up considering exercises which do not exist (e.g., hypothetical ones before the #1 exercise or after the highest numbered exercise). In these cases, the distributions may run the RNG such that if it chooses a number that does not correspond to any exercise, it just runs the RNG again until it does choose one that is assigned. In an example, it may just reassign numbers for the non-existent exercises in proper proportion to the ones that are in the range of the distribution and do have actual exercises assigned to them.

In many cases, a training progression is designed such that one exercise may be introduced before another. This is dealt with in this Gaussian Distribution Varied Practice Assurance System. In an example, a standard of proficiency test may be used to unlock the ability to be introduced to the dependent exercise.

One way to implement this may be to allow the dependent exercise to be selected, but if its pre-requisite (or pre-requisites) have not been satisfied then the system defaults to the rearmost pre-requisite relative to the distribution. In an example, any dependent exercises whose pre-requisites have not been chosen may have their selection field reassigned in some way to the pre-requisite exercises that the RNG may choose from.

In an example, these contingencies may be non-issues if a pseudo-random sequence of exercises was pre-arranged to be worked through where advancing still demands passing a skill proficiency threshold for each exercise. This includes that an exercise in the serialized sequence may have a sub-sequence underneath it that approximates random selection of it and the exercises around it to create a varied practice sequence to work through while the user tries to pass that exercise's proficiency standard.

To do this, a randomization system of a type among those described above may be applied in advance such that surrounding exercises are considered during creation of the sub-sequence for each skill proficiency threshold exercise. However, this randomization may be done during a product production phase as opposed to on the fly during user interaction as in the cases described above. The result is a pre-fabricated sequence of exercises (indeed a sub-sequence of the full progression for the sport or movement discipline) to work through while the user tries to pass the proficiency standard for a threshold for a certain exercise in a certain sport or other movement discipline. Also, considerations described above including establishing a pre-requisite system may be included in the design in this pre-fabricated method.

In an embodiment, the sequence of exercises may be long to ensure that a representative set of the possible exercises that may have the Gaussian (or other) distribution applied to them may be chosen. In this case, a "long" sequence may mean something like a string of 100 exercises. To be more general, if the randomization system was considering nine exercises to include in randomized order in the given sequence, then a long sequence may be ten times nine (ninety), or more. So, in general, it may be around ten times the number of exercises in consideration at that threshold, or more.

After a first pass of randomizing a sequence in this way, a human or computer system may apply rules that rearrange the order of the exercises in the sequence to ensure:

no long string occurs with too many instances of the same exercises; and each exercise is somewhat evenly distributed throughout the sequence in the portions of the progression where that exercise fits. (Which means the result may not actually be random, but by starting with a random method and then applying subtle adjustments it may allow both of the following qualities; the illusion of randomness for the user, good representation of exercises in all parts of the sequence).

The exercise that represents the current proficiency threshold may be chosen at least "n" number of selections.

In this way, a good logical selection of exercises may be applied throughout the progression. It also accommodates the case where the user passes the threshold quickly by making sure that a good mix of exercises is applied early in the sequence.

An additional consideration may be accounted for. What if the user does not pass the proficiency standard before the sequence is used up? The solution is just to restart the sequence and run it again until the user does pass. By making the sequence quite long, it is hard for the user to detect that they have worked through it and are starting over.

Figure 8:
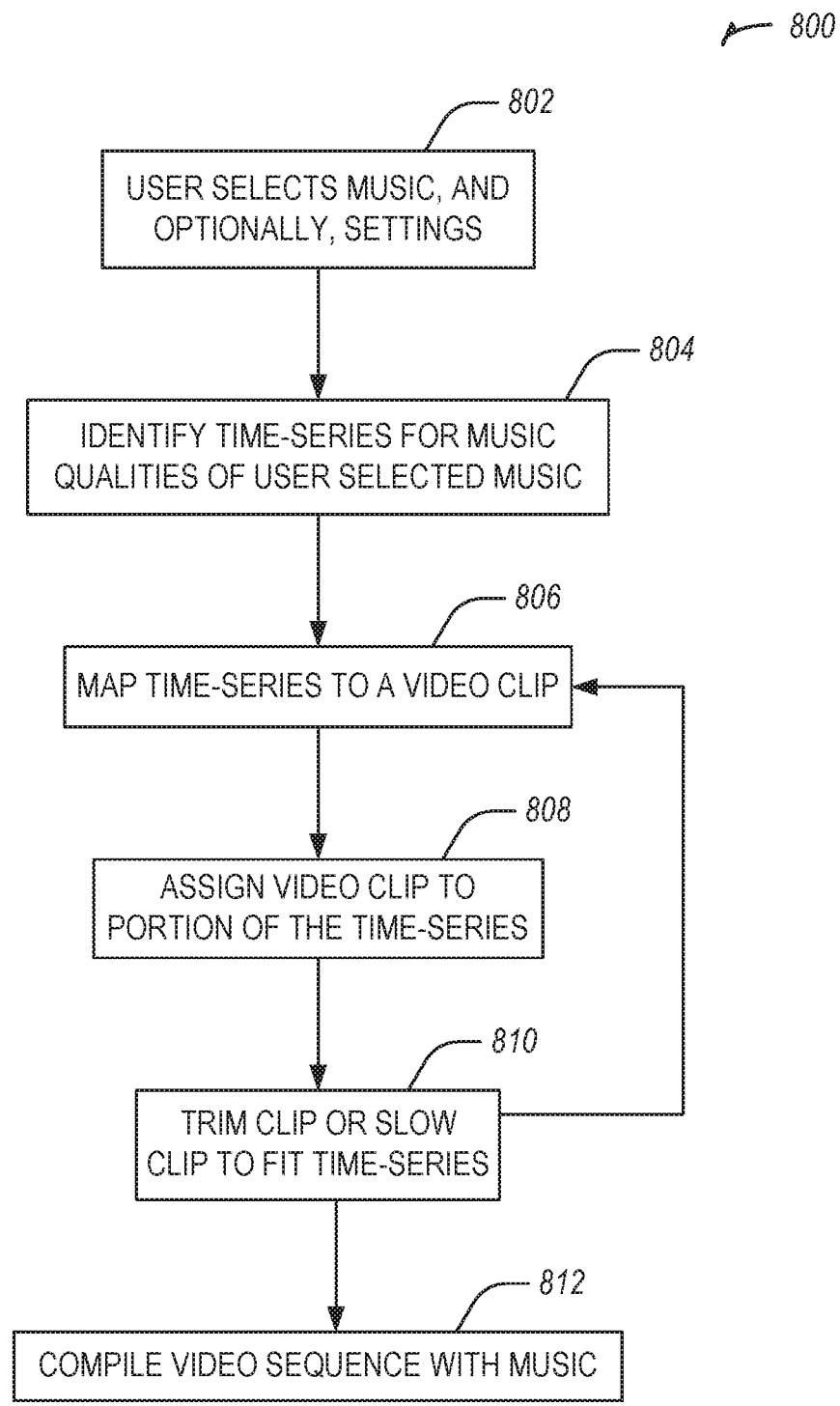
FIG. 8 illustrates a flowchart showing a technique for a customizable quick hitter video sequence in accordance with some examples.

FIG. 8 illustrates a flowchart showing a technique 800 for a customizable quick hitter video sequence in accordance with some examples.

The technique 800 includes an operation 802 to receive user selection of music, and optionally other settings, such as duration, tempo, or the like.

The technique 800 includes an operation 804 to identify a time-series for music qualities of the user selected music.

The technique 800 includes an operation 806 to map the time-series to a video clip.

The technique 800 includes an operation 808 to assign the video clip to a portion of the time-series.

The technique 800 includes an operation 810 to trim the clip, slow the clip, expand a portion of the clip, repeat a portion of the clip or the like to fit the time-series. The technique may return to operation 806 to continue selecting and modifying video clips to fit the music.

The technique 800 includes an operation 812 to compile a video sequence using the music and any generated clips.

Many great businesses these days have achieved very rapid growth by creating a system for users to create content and a platform for them to share that content. With this, companies get two great benefits. First is growth via the efforts of customers to share with their friends which may be explosive. Second is user stickiness because they may not leave the ecosystem without losing the network effect that becomes built into it and the tools you create to keep that network engaging.

This stickiness factor may create limitations on one way to use a network effect to drive growth, that being sharing of user created content, because it implies that they must use tools from inside the ecosystem to create the user created content. Typically, this limitation is only a benefit to the company that hosts the social network however.

Another way to leverage a network effect is to make the value be in the connections from user to user that it facilitates. This is the classic internet social network. In this category, four types may be featured.

The social network where the connections from user to user are based on real life friendships.

The entertainment social network where the choice to connect is based on "following" people and organizations that interest you or entertain you. These may be friends or celebrities.

The professional social network based on user perception that being connected to others may enhance their professional opportunities.

The geographic social network connecting people based on the proximity of their homes.

For some companies, opening the door to social and network effects may risk giving away the secret sauce. However, there may be a sharing-of-user-created-content "light" concept which may reopen the door to network effects for a company like this. Within the visual-based training paradigm, the user creation and sharing system may be used to create short customized videos. In addition to the satisfaction of creating something, users may find utility with these short customized videos mostly to prime the user's motor control circuitry prior to an activity to get more out of practice or enhance in-game performance.

Customizable System

The following scheme outlines the mechanisms of user choice and the system for crafting customized outputs.

In order to create a customized system, users may go through the following operations.

Choose or upload music—The system customization tool may allow the user to choose music from a list or to upload a music file in their possession.

Choose a technique—The user may then choose which technique that they may like to make the subject of the system. Rules may be used for what technique may be made available to a user relative to their position in their progression and as a way to limit how much secret sauce may be shared.

Additional Customization Options

The system may also accommodate adjustments related to the visual style

The system may adjust the editing style in terms of the timing of cuts, emphasis on slow motion, and repetition of same or similar clips With those choices understood, it is useful to now consider what sub-systems of the system they may modify.

A selection made with respect to customization types 1 and 3b above may modify selection of techniques used to construct the system.

A selection made with respect to customization types 2 and 3a above may modify the library from which clips are drawn from in order to fit them into the output system.

The concept is to select clips from a library and then fit those into a scheme such that the nature of the music correlates to the nature of the clips and the timing of the cuts between clips. Let's now understand how the system works. The first thing that may be done is to analyze the song selection and classify its structure along its time line.

This structure contains things such as beats, harmonics, and movements. Certain video clips may be suited for certain types of harmonics or movements. Clip lengths may be trimmed in order to fit such that cuts between clips may line up with the most intense beats in the music.

Once this structure is understood and a moment of the song is classified those classifications may be matched up with metadata assigned to the video clips in the video library from which they may be chosen. This may be done such that clips that are suited to certain musical structures may be arranged to match up to those times of the song that feature those structures.

In order to match the cuts between clips to the most significant beats of the song in a way that accommodates songs with timing between beats that may not be predicted in advance, the system may be capable of adjusting the length of clips. There are a couple of ways to do this. One is to trim the clip. The other is to adjust the frame rate.

Trimming the clip is somewhat straight forward, except that a clip has subject matter which is the focus of the imagery. In an example, this subject matter is a human figure performing a technique. This subject matter may remain "centered" in the clip timing-wise. In an example, if a clip is trimmed it may be trimmed equally from the beginning and the end of the clip. Metadata for the clip may include the timing of the "subject center" of the clip such that trimming be done symmetrically around that subject center and a minimum clip length that may be used to ensure that the system does not trim it too short.

Adjustment of the frame rate of the clip may also have some rules. First, it is unlikely that the system may allow making a longer clip shorter by speeding up the frame rate of a clip to a "faster than natural" speed. This is largely because the value of the Customizable system may be almost entirely in the user experience, and the experience of watching things in fast motion tends to be unpleasant over sustained periods of time. If this assumption is not strictly true, there may at least be a limit to how fast is allowed. Likewise, there may be limits to how slow a clip may be made. Taking a non-slow motion clip and making it slow involves duplicating frames. If this is taken too far the result may be unpleasant.

In an example, the library from which these clips may be selected may be modified. Once again metadata assigned to a clip may provide a structure through which the field may be narrowed. So, in a sense the system has its full library as a starting point. Then when the user chooses a technique to be the subject of the video then clips featuring that technique may be under consideration. When a user chooses a visual style, the field may narrow further to include the selected technique featuring the selected visual style. It is conceivable that the system may be configured to include multiple visual styles.

Multiple techniques may be trickier to accommodate. This is because the identity of a system designed by a company for the purpose of visual-based movement skills training may need to be preserved and just mixing techniques for aesthetic reason gets too far away from the training effect focus upon which system technology is founded. So, if the user selects multiple techniques to include, the full duration of the song may be broken up in a special way to accommodate that choice.

The song may be broken up into n+1 parts (the exact timing of the switch from one part to the next may be on the beat which is nearest the calculated cutoff point) where n is the number of techniques chosen. Then in the first part, technique 1 may be featured. In the second part, technique 2 may be featured. In part n, technique n may be featured. Then in the final portion of the song, the techniques may be mixed together in a "grand finale" sort of as you'd expect in a fireworks show.

There may be rules for sharing though. These rules may be different if you are a subscriber to a service or if you are not. In order to facilitate this, a free viewer app may be generated. This app may construct the output video on the fly from a record of the audio input and the sequence of clips selected. This stands opposed to making a self-contained "recording" of the output video to share. A sequence may then be made available to non-subscribers for a certain period of time or a certain number of viewings. Subscribers may have unlimited access to shared sequences which are shared by their friends. In order to entice folks without even the viewer app, a select few self-contained videos may be allowed, but this may be even more limited in order to limit value to non-subscribers.

In examples of ways that sharing may be limited, if sharing is happening to anyone outside of the group of subscribers to the system, the duration of the videos may be limited and the technique content choices may also be limited. In an example, when shared outside of the subscriber community, the videos may be no longer than 30 seconds. In an example, when shared outside of the subscriber community, the videos may be limited to only a few techniques for each discipline. For example, in baseball, maybe only videos based on a fastball pitch and a right handed batting (for average) technique would be allowed to be shared outside of the subscriber community.

Figure 9:
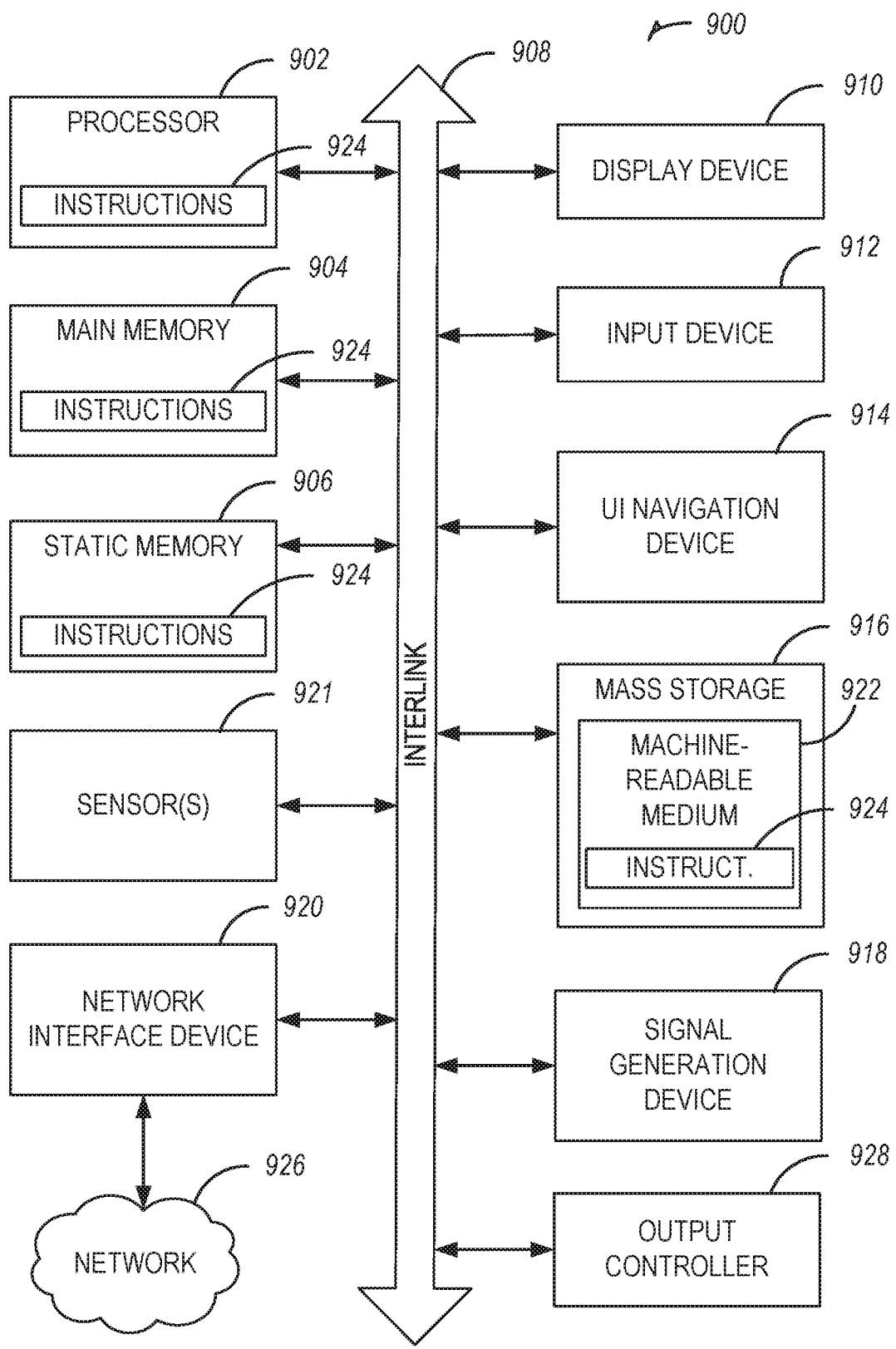
FIG. 9 illustrates generally an example of a block diagram of a machine upon which any one or more of the techniques discussed herein may perform in accordance with some embodiments.

FIG. 9 illustrates generally an example of a block diagram of a machine 900 upon which any one or more of the techniques discussed herein may perform in accordance with some embodiments. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a virtual reality machine, a head mounted display, a personal computer (PC), a tablet PC, a set-top box (SIB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), e Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Example 1 is a method comprising: receiving, at a processor of a user device, a selection of a technique including a physical motion to be learned by a user; displaying, at a display of the user device, video content of the technique performed by a model during a mental imagery training exercise; replaying the video content with a portion of the model at a first transparency level; and in response to completion of replaying the video content, playing an audio tone after waiting a period of time, using a speaker of the user device to indicate the mental imagery training exercise is complete.

In Example 2, the subject matter of Example 1 includes, replaying the video content with the portion of the model at a second transparency level after replaying the video content with the portion of the model at the first transparency level, wherein the second transparency level is more transparent than the first transparency level.

In Example 3, the subject matter of Example 2 includes, while replaying the video content with the portion of the model at the second transparency level, replaying part of the video content at full opacity.

In Example 4, the subject matter of Examples 1-3 includes, replaying the video content with the portion of the model obscured, wherein the portion of the model is a body part performing an action corresponding to the mental imagery training exercise.

In Example 5, the subject matter of Example 4 includes, wherein replaying the video content with the portion of the model obscured includes playing only a background of the video content.

In Example 6, the subject matter of Examples 1-5 includes, wherein the audio tone is a second audio tone, and further comprising playing a first audio tone when replaying the video content with the portion of the model at the first transparency level starts.

In Example 7, the subject matter of Examples 1-6 includes, wherein the model is displayed using a third person perspective.

In Example 8, the subject matter of Examples 1-7 includes, tracking a biometric value of the user to detect whether the user is inattentive to the video content, and in response to determining that the user is inattentive, playing audio including a name of the user.

In Example 9, the subject matter of Examples 1-8 includes, wherein the method is repeated according to a serialized progression including a plurality of techniques similar to the technique based on the selection of the technique.

In Example 10, the subject matter of Example 9 includes, wherein the plurality of techniques similar to the technique are selected based on probabilities assigned to the plurality of techniques at a threshold of proficiency of the user for the technique and a Random Number Generator.

Example 11 is a non-transitory machine-readable medium including instructions, which when executed by a processor cause the processor to perform operations to: receive, at a user device, a selection of a technique including a physical motion to be learned by a user; output for display, at a display of the user device, video content of the technique performed by a model during a mental imagery training exercise; output for replaying the video content with a portion of the model at a first transparency level; and in response to completion of replaying the video content, cause an audio tone to be played after waiting a period of time, using a speaker of the user device, to indicate the mental imagery training exercise is complete.

In Example 12, the subject matter of Example 11 includes, instructions to cause the processor to output for replaying the video content with the portion of the model at a second transparency level after replaying the video content with the portion of the model at the first transparency level, wherein the second transparency level is more transparent than the first transparency level.

In Example 13, the subject matter of Example 12 includes, instructions to cause the processor to, while the video content with the portion of the model is replaying at the second transparency level, output for replaying a part of the video content at full opacity.

In Example 14, the subject matter of Examples 11-13 includes, instructions to cause the processor to output for replaying the video content with the portion of the model obscured, wherein the portion of the model is a body part performing an action corresponding to the mental imagery training exercise.

In Example 15, the subject matter of Example 14 includes, wherein to output for replaying the video content with the portion of the model obscured, the instructions further cause the processor to output only a background of the video content for playing.

Example 16 is a user device comprising: a processor coupled to memory including instructions, which when executed by the processor, cause the processor to receive a selection of a technique including a physical motion to be learned by a user; a display to: display video content of the technique performed by a model during a mental imagery training exercise; and replay the video content with a portion of the model at a first transparency level; and a speaker to, in response to completion of replaying the video content, play an audio tone after waiting a period of time, the audio tone indicating the mental imagery training exercise is complete.

In Example 17, the subject matter of Example 16 includes, wherein the model is displayed using a third person perspective.

In Example 18, the subject matter of Examples 16-17 includes, a biometric component to track a biometric value of the user to detect whether the user is inattentive to the video content, and wherein in response to determining that the user is inattentive, the speaker is further to play audio including a name of the user.

In Example 19, the subject matter of Examples 16-18 includes, wherein the display is further to repeat the operations to display the video content, and replay the video content with the portion of the model at the first transparency level, according to a serialized progression including a plurality of techniques similar to the technique based on the selection of the technique.

In Example 20, the subject matter of Example 19 includes, wherein the plurality of techniques similar to the technique are selected based on probabilities assigned to the plurality of techniques at a threshold of proficiency of the user for the technique and a Random Number Generator.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
   receiving, at a processor of a user device, a selection of a technique including a physical motion to be learned by a user;
   displaying, at a display of the user device, video content of the technique performed by a model during a mental imagery training exercise;
   replaying the video content with a portion of the model at a first transparency level;
   in response to completion of replaying the video content, playing an audio tone;
   after replaying the video content and after playing the audio tone, presenting a blank screen for a period of time corresponding to a duration of the video content; and
   after expiration of the period of time, using a speaker of the user device to play the audio tone to indicate the mental imagery training exercise is complete.

2. The method of claim 1, further comprising replaying the video content with the portion of the model at a second transparency level after replaying the video content with the portion of the model at the first transparency level, wherein the second transparency level is more transparent than the first transparency level.

3. The method of claim 2, further comprising while replaying the video content with the portion of the model at the second transparency level, replaying part of the video content at full opacity.

4. The method of claim 1, further comprising replaying the video content with the portion of the model obscured, wherein the portion of the model is a body part performing an action corresponding to the mental imagery training exercise.

5. The method of claim 4, wherein replaying the video content with the portion of the model obscured includes playing only a background of the video content.

6. The method of claim 1, wherein the audio tone is a second audio tone, and further comprising playing a first audio tone when replaying the video content with the portion of the model at the first transparency level starts.

7. The method of claim 1, wherein the model is displayed using a third person perspective.

8. The method of claim 1, further comprising tracking a biometric value of the user to detect whether the user is inattentive to the video content, and in response to determining that the user is inattentive, playing audio including a name of the user.

9. The method of claim 1, wherein the method is repeated according to a serialized progression including a plurality of techniques similar to the technique based on the selection of the technique.

10. The method of claim 9, wherein the plurality of techniques similar to the technique are selected based on probabilities assigned to the plurality of techniques at a threshold of proficiency of the user for the technique and a Random Number Generator.

11. A non-transitory machine-readable medium including instructions, which when executed by a processor cause the processor to perform operations to:
- receive, at a user device, a selection of a technique including a physical motion to be learned by a user;
- output for display, at a display of the user device, video content of the technique performed by a model during a mental imagery training exercise;
- output for replaying the video content with a portion of the model at a first transparency level;
- in response to completion of replaying the video content, cause an audio tone to be played;
- after replaying the video content and after playing the audio tone, presenting a blank screen for a period of time corresponding to a duration of the video content; and
- after expiration of the period of time, using a speaker of the user device, cause the audio tone to be played to indicate the mental imagery training exercise is complete.

12. The machine-readable medium of claim 11, further comprising instructions to cause the processor to output for replaying the video content with the portion of the model at a second transparency level after replaying the video content with the portion of the model at the first transparency level, wherein the second transparency level is more transparent than the first transparency level.

13. The machine-readable medium of claim 12, further comprising instructions to cause the processor to, while the video content with the portion of the model is replaying at the second transparency level, output for replaying a part of the video content at full opacity.

14. The machine-readable medium of claim 11, further comprising instructions to cause the processor to output for replaying the video content with the portion of the model obscured, wherein the portion of the model is a body part performing an action corresponding to the mental imagery training exercise.

15. The machine-readable medium of claim 14, wherein to output for replaying the video content with the portion of the model obscured, the instructions further cause the processor to output only a background of the video content for playing.

16. A user device comprising:
- a processor coupled to memory including instructions, which when executed by the processor, cause the processor to receive a selection of a technique including a physical motion to be learned by a user;
- a display to:
- display video content of the technique performed by a model during a mental imagery training exercise; and
- replay the video content with a portion of the model at a first transparency level; and
- a speaker to, in response to completion of replaying the video content, play an audio tone;
- wherein the display is further to, after replaying the video content and after playing the audio tone, present a blank screen for a period of time corresponding to a duration of the video content; and
- wherein after expiration of the period of time, the speaker is further to play the audio tone indicating the mental imagery training exercise is complete.

17. The user device of claim 16, wherein the model is displayed using a third person perspective.

18. The user device of claim 16, further comprising a biometric component to track a biometric value of the user to detect whether the user is inattentive to the video content, and wherein in response to determining that the user is inattentive, the speaker is further to play audio including a name of the user.

19. The user device of claim 16, wherein the display is further to repeat the operations to display the video content, and replay the video content with the portion of the model at the first transparency level, according to a serialized progression including a plurality of techniques similar to the technique based on the selection of the technique.

20. The user device of claim 19, wherein the plurality of techniques similar to the technique are selected based on probabilities assigned to the plurality of techniques at a threshold of proficiency of the user for the technique and a Random Number Generator.

* * * * *